(12) United States Patent
Imura

(10) Patent No.: US 6,917,643 B2
(45) Date of Patent: Jul. 12, 2005

(54) DIFFUSION CODE GENERATOR, CDMA COMMUNICATION APPARATUS USING THE SAME, AND DIFFUSION CODE GENERATING METHOD USED THEREFOR

(75) Inventor: Minoru Imura, Tokyo (JP)

(73) Assignee: NEC Corporation, Tokyo (JP)

( * ) Notice: Subject to any disclaimer, the term of this patent is extended or adjusted under 35 U.S.C. 154(b) by 727 days.

(21) Appl. No.: 09/775,531

(22) Filed: Feb. 1, 2001

(65) Prior Publication Data

US 2001/0014113 A1 Aug. 16, 2001

(30) Foreign Application Priority Data

Feb. 9, 2000 (JP) ........................................ 2000-031343

(51) Int. Cl.[7] .................................................. H04B 1/69
(52) U.S. Cl. .................... 375/140; 375/149; 375/136; 375/377; 370/206; 370/342; 370/335
(58) Field of Search ................................ 375/140, 149, 375/136, 377; 370/206, 342, 335

(56) References Cited

U.S. PATENT DOCUMENTS

| 5,105,436 | A | * | 4/1992 | Mori et al. ................. 375/149 |
| 5,544,156 | A | * | 8/1996 | Teder et al. ................. 370/342 |
| 5,559,788 | A | * | 9/1996 | Zscheile et al. ............ 370/206 |
| 5,771,288 | A | | 6/1998 | Dent et al. |
| 5,956,641 | A | | 9/1999 | Bruckert et al. |
| 6,366,603 | B1 | * | 4/2002 | Uchida et al. .............. 375/136 |
| 6,477,158 | B1 | * | 11/2002 | Take .......................... 370/335 |
| 6,658,076 | B1 | * | 12/2003 | Hayata ....................... 375/377 |

FOREIGN PATENT DOCUMENTS

| JP | 2-295215 | | 12/1990 | |
| JP | 3-120125 | | 12/1991 | |
| JP | 5-110538 | | 4/1993 | |
| JP | 7-58668 | | 3/1995 | |
| JP | 7-86984 | | 3/1995 | |
| JP | 08251076 | * | 9/1996 | ........... H04B/1/707 |
| JP | 10-22989 | | 1/1998 | |
| JP | 11-145933 | | 5/1999 | |
| JP | 11145933 | * | 5/1999 | ........... H04J/13/00 |
| JP | 11-186989 | | 7/1999 | |
| JP | 11186989 | * | 7/1999 | ........... H04J/13/04 |
| JP | 2000-59264 | | 2/2000 | |
| JP | 2001-326589 | | 11/2001 | |
| WO | WO 99/03224 | | 1/1999 | |

OTHER PUBLICATIONS

WO 99/03224; PCT International Application; Jan. 21, 1999.*
Abstract of Japanese Laid–Open Patent Publication No. 63–146533, dated Jun. 18, 1988.
Abstract of Japanese Laid–Open Patent Publication No. 08–251076, dated Sep. 27, 1996.
Japanese Office Action together with an English language translation.

* cited by examiner

*Primary Examiner*—Stephen Chin
*Assistant Examiner*—Sudhanshu C. Pathak
(74) *Attorney, Agent, or Firm*—Scully, Scott, Murphy & Presser

(57) ABSTRACT

To provide a diffusion code generator capable of rendering interception and eavesdropping of communication difficult without influencing communication quality and transmission data. The spreading code generator generates orthogonal code list SP of a diffused information data rate cycle. Scrambling code generators generate M length code $SC_i$, $SC_q$ of relatively long cyclicity respectively. Diffusion codes for in-phase components and orthogonal components are computed by ExOR circuits respectively, and diffusion code for in-phase components $C_i$ and diffusion code for orthogonal components $C_q$ are generated. A timer changes orthogonal code list SP currently set in a TTI cycle to another different type. In this case, switching by the timer is possible either only in a TTI cycle or in a cycle of $T2=N*T1$ (N: integer) taking opportunity of TTI or layer 1 synchronous interval unit T3.

32 Claims, 12 Drawing Sheets

DIFFUSION CODE GENERATOR, CDMA COMMUNICATION APPARATUS USING THE SAME, AND DIFFUSION CODE GENERATING METHOD USED THEREFOR

BACKGROUND OF THE INVENTION

1. Field of the Invention

The present invention relates to a diffusion code generator, a CDMA communication apparatus using the diffusion code generator and a method of generating a diffusion code used therefor, in particular to generation of a diffusion code in a CDMA (Code Division Multiple Access) communication apparatus.

2. Description of the Related Art

Conventionally, in a CDMA communication apparatus, a code is used to allow multiple communication in order to distinguish and divide the communication channels, which is different from a frequency in a FDMA (Frequency Division Multiple Access) system and time in TDMA (Time Division Multiple Access) system.

One of the major advantages of CDMA communication is high concealability. A factor responsible for being capable of maintaining such high concealability is highly related to length of cyclicity of a diffusion code.

Normally, a configuration as shown in FIG. 11 is used to generate this diffusion code. In FIG. 11, spreading code generator 31 is used in order to maintain orthogonality for each rate cycle of data to be diffused (information data) and usually has approximately 4 to 1024 cycles. In spreading code generator 31, a Walsh code and a hierarchical orthogonal code and so on are used.

Scrambling code generators 32 and 33 are mainly used to render power flux density on a frequency axis average or more concealable, whereby a code such as M(Maximum) length code, namely one having a cycle of $2^{30}$ or so is usually used. Moreover, in FIG. 11, 34 and 35 indicate Exclusive OR (ExOR) circuits.

In addition, to distinguish between a plurality of terminals and communication channels, the same base station uses a diffusion code unique to each individual communication channel or each individual terminal and a scrambling code is usually shared. In this case, even though CDMA communication is highly concealable, interception and eavesdropping thereof become possible if the above two types of code can be identified.

Japanese Patent Laid-Open No. 11-145933 discloses a method whereby, in spread spectrum communication represented by the above CDMA communication, the type of applicable diffusion code list is cyclically or irregularly changed between spread spectrum communication apparatuses during the communication period when sending and receiving a transmitting signal itself in a diffused manner using a diffusion code in order to render the communication more concealable.

As shown in FIG. 12, this method provides a plurality (N pieces) of original diffusion code generators 41-1 to 41-N for generating different types of diffusion code list, and switches diffusion codes from these original diffusion code generators 41-1 to 41-N in response to a switching signal by selection switch 42.

On the other hand, the above CDMA communication includes the WCDMA (Wideband Code Division Multiple Access) method being considered by 3GPP (3rd Generation Partnership Project).

The 3GPP-specification structure of an uplink transport channel to a physical channel is as shown in FIG. 3, and the 3GPP-specification structure of a downlink transport channel to a physical channel is as shown in FIG. 4.

In addition, processing is performed by a procedure as shown in FIG. 5 (processes S1 to S11) in a 3GPP-specification uplink for DPCH, and processing is performed by a procedure as shown in FIG. 6 (processes S21 to S32) in a 3GPP-specification downlink for DPCH. In such a WCDMA method, a diffusion modulation using a diffusion code is performed in units of data comprising each individual slot shown in FIG. 3.

While the above-mentioned conventional CDMA communication is a system of high concealability, interception and eavesdropping thereof become possible if the diffusion code and scramble code can be identified. Thus, even CDMA communication of high concealability is highly likely to be intercepted and eavesdropped if a fixed diffusion code list is used during communication.

In addition, while the method described in the above bulletin cyclically or irregularly changes the type of applicable diffusion code list, it is not decided whether or not the type of diffusion code list is changed on a network so that there is a possibility that the type of diffusion code list after the change may overlap a type thereof used by another user.

Moreover, as the method described in the above bulletin does not take into consideration influence on the characteristics of a network such as communication quality and transmission data when cyclically or irregularly changing the type of diffusion code list, it may lead to partial elimination of data and so on along with the change of the type of diffusion code list to influence communication quality and transmission data.

SUMMARY OF THE INVENTION

Thus, an object of the present invention is to solve the above-mentioned problems and provide a diffusion code generator capable of rendering interception and eavesdropping of communication difficult without influencing any communication quality and send data, a CDMA communication apparatus using it and a method of generating a diffusion code used therefor.

A diffusion code generator according to the present invention includes: means for generating a spreading code that generates a code list of high orthogonality; means for generating a scrambling code that generates a code list of a long cycle; and computing means for performing a logical operation of the code lists generated in the above described means for generating a diffusion code and the above described means for generating a scrambling code respectively, and has timer means for changing during communication the type of code list generated in either the above described means for generating a spreading code or the above described means for generating a scrambling code.

The other diffusion code generator according to the present invention includes: means for generating a spreading code that generates a code list of high orthogonality; means for generating a scrambling code that generates a code list of a long cycle; and computing means for performing a logical operation of the code lists generated in the above described means for generating a spreading code and the above described means for generating a scrambling code respectively, and it has timer means that changes during communication the type of code list generated in either the above described means for generating a spreading code or the above described means for generating a scrambling code, based on an L1 synchronizing cycle determined by a CRC (Cyclic Redundancy Check code) check.

Another diffusion code generator according to the present invention includes: means for generating a spreading code that generates a code list of high orthogonality; means for generating a scrambling code that generates a code list of a long cycle; and computing means for performing a logical operation of the code lists generated in the above described means for generating a spreading code and the above described means for generating a scrambling code respectively, and has timer means for changing the type of code list generated in either the above described means for generating a spreading code or the above described means for generating a scrambling code, based on a degradation trigger of a signal/noise ratio used for controlling transmission power at least.

A CDMA communication apparatus according to the present invention is one for performing communication between a base station and a plurality of terminals by using a diffusion code generated by a diffusion code generator, wherein the above described diffusion code generator includes: means for generating a spreading code that generates a code list of high orthogonality; means for generating a scrambling code that generates a code list of a long cycle; computing means for performing a logical operation of the code lists generated in the above described means for generating a spreading code and the above described means for generating a scrambling code respectively; and timer means changing during communication the type of code list generated in either the above described means for generating a spreading code or the above described means for generating a scrambling code.

The other CDMA communication apparatus according to the present invention is one for performing communication between a base station and a plurality of terminals by using a diffusion code generated by a diffusion code generator, wherein the above described diffusion code generator includes: means for generating a spreading code that generates a code list of high orthogonality; means for generating a scrambling code that generates a code list of a long cycle; computing means for performing a logical operation of the code lists generated in the above described means for generating a diffusion code and the above described means for generating a scrambling code respectively; and timer means for changing during communication the type of code list generated in either the above described means for generating a spreading code or the above described means for generating a scrambling code, based on an L1 synchronizing cycle determined by a CRC (Cyclic Redundancy Check code) check.

Another CDMA communication apparatus according to the present invention is one for performing communication between a base station and a plurality of terminals by using a diffusion code generated by a diffusion code generator, wherein the above described diffusion code generator includes: means for generating a spreading code that generates a code list of high orthogonality; means for generating a scrambling code that generates a code list of a long cycle; computing means for performing a logical operation of the code lists generated in the above described means for generating a spreading code and the above described means for generating a scrambling code respectively; and timer means for changing the type of code list generated in either the above described means for generating a spreading code or the above described means for generating a scrambling code, based on a degradation trigger of a signal/noise ratio used for controlling transmission power at least.

A first method of generating a diffusion code according to the present invention is one of a diffusion code generator, including: means for generating a spreading code that generates a code list of high orthogonality; means for generating a scrambling code that generates a code list of a long cycle; and computing means for performing a logical operation of the code lists generated in the above described means for generating a spreading code and the above described means for generating a scrambling code respectively, wherein the type of code list generated in either the above described means for generating a spreading code or the above described means for generating a scrambling code is changed during communication.

A second method of generating a diffusion code according to the present invention is one of a diffusion code generator, including: means for generating a spreading code that generates a code list of high orthogonality; means for generating a scrambling code that generates a code list of a long cycle; and computing means for performing a logical operation of the code lists generated in the above described means for generating a spreading code and the above described means for generating a scrambling code respectively, wherein the type of code list generated in either the above described means for generating a spreading code or the above described means for generating a scrambling code is changed during communication, based on an L1 synchronizing cycle determined by a CRC (Cyclic Redundancy Check code) check.

A third method of generating a diffusion code according to the present invention is one of a diffusion code generator, including: means for generating a spreading code that generates a code list of high orthogonality; means for generating a scrambling code that generates a code list of a long cycle; and computing means for performing a logical operation of the code lists generated in the above described means for generating a spreading code and the above described means for generating a scrambling code respectively, wherein the type of code list generated in either the above described means for generating a spreading code or the above described means for generating a scrambling code is changed, based on a degradation trigger of a signal/noise ratio used for controlling transmission power at least.

A fourth method of generating a diffusion code according to the present invention is one of a CDMA communication apparatus for performing communication between a base station and a plurality of terminals by using a diffusion code generated by a diffusion code generator, wherein the above described diffusion code generator changes during communication the type of code list generated in either means for generating a spreading code that generates a code list of high orthogonality or means for generating a scrambling code that generates a code list of a long cycle.

A fifth method of generating a diffusion code according to the present invention is one of a CDMA communication apparatus for performing communication between a base station and a plurality of terminals by using a spreading code generated by a diffusion code generator, wherein said diffusion code generator changes during communication the type of code list generated in either means for generating a diffusion code that generates a code list of high orthogonality or means for generating a scrambling code that generates a code list of a long cycle, based on an L1 synchronizing cycle determined by a CRC (Cyclic Redundancy Check code) check.

A sixth method of generating a diffusion code according to the present invention is one of a CDMA communication apparatus for performing communication between a base station and a plurality of terminals by using a diffusion code generated by a diffusion code generator, wherein the above described diffusion code generator changes the type of code list generated in either means for generating a spreading code that generates a code list of high orthogonality or means for generating a scrambling code that generates a code list of a long cycle, based on a degradation trigger of a signal/noise ratio used for controlling transmission power at least.

That is, a CDMA communication apparatus of the present invention is intended to implement higher concealability by changing a spreading code or a scrambling code during communication based on a degradation trigger such as TTI (Transmission Time Interval: L1 synchronizing cycle) or SIR (Signal/Interval Ratio).

One of the major advantages of CDMA communication is high concealability. A factor responsible for being capable of maintaining such high concealability is highly related to length of cyclicity of a diffusion code. Thus, the present invention periodically changes a diffusion code during communication in order to have further concealability.

Usually, a spreading code generator or a scrambling code generator is used for generation of such a diffusion code. A spreading code generator is used to maintain orthogonality for each rate cycle of data to be diffused (information data) and usually has approximately 4 to 1024 cycles, and a Walsh code and a hierarchical orthogonal code and so on are used.

A scrambling code generator is mainly used to render power flux density on a frequency axis average or more concealable, whereby a code such as M length code, namely one having a cycle of $2^{30}$ or so is usually used.

Also, to distinguish between a plurality of terminals and communication channels, the same base station uses a spreading code unique to each individual communication channel or each individual terminal and a scrambling code is usually shared. Although it is a system of high concealability, interception and eavesdropping of communication become possible if the above two types of code can be identified.

Therefore, the present invention changes the above spreading code or scrambling code during communication based on TTI (Transmission Time Interval: LI synchronization cycle) of an L1 synchronization OK/NG determined by a CRC (Cyclic Redundancy Check code) check and a degradation trigger such as SIR (Signal/Interval Ratio) used for controlling transmission power and so on. It thus allows higher concealability without influencing communication quality and transmission data, consequently rendering interception and eavesdropping of communication difficult.

DESCRIPTION OF THE PREFERRED EMBODIMENT

Figure 1:
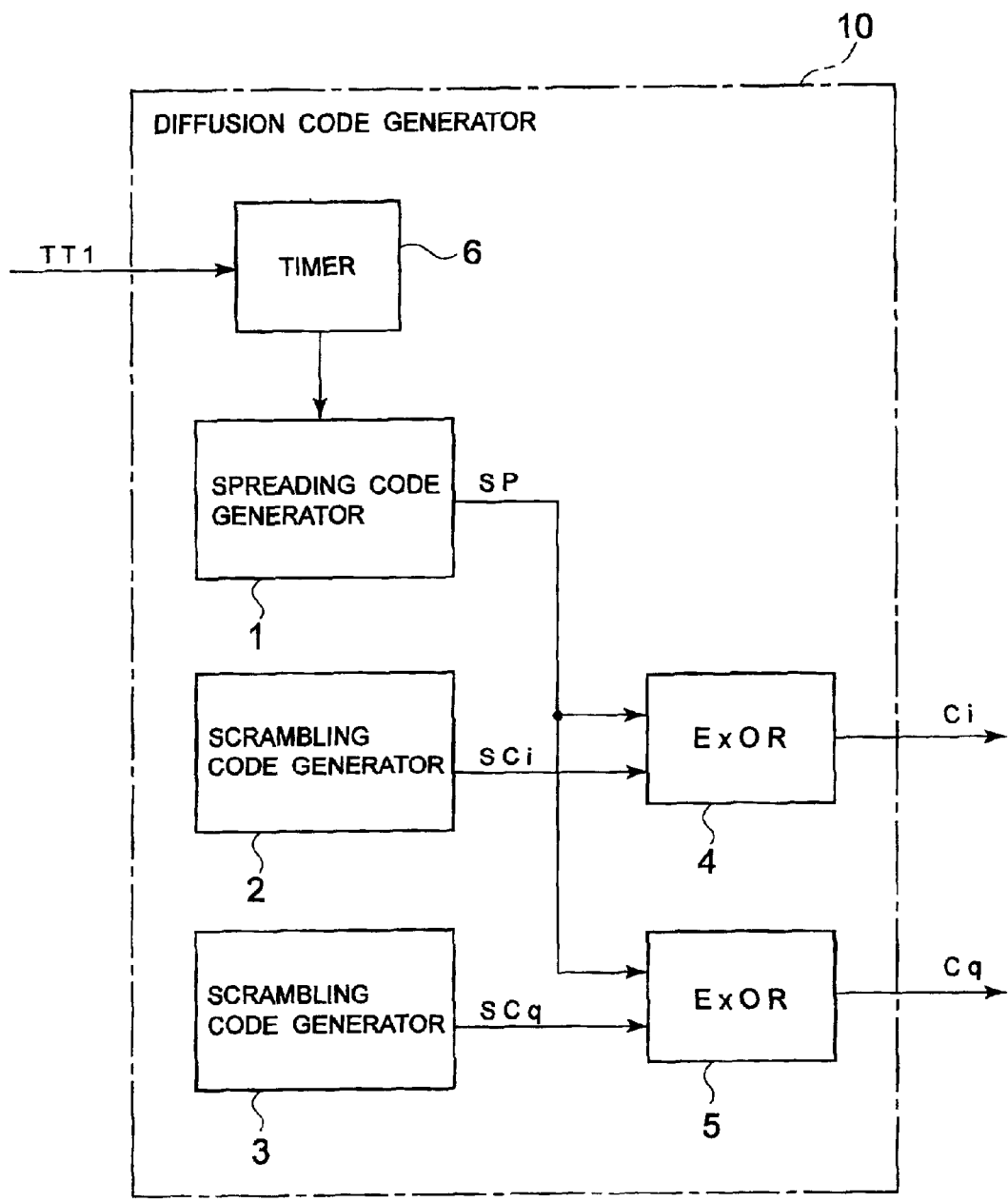
FIG. 1 is a block diagram showing a configuration of a diffusion code generator according to an embodiment of the present invention.

Next, embodiments of the present invention will be described by referring to the drawings. FIG. 1 is a block diagram showing a configuration of a diffusion code generator according to an embodiment of the present invention. In FIG. 1, a diffusion code generator 10 is a circuit for generating a diffusion code in a CDMA communication system, comprising a spreading code generator 1, scrambling code generators 2, 3, Exclusive OR (ExOR) circuits 4, 5 and a timer 6.

A CDMA communication system allows multiple communication by using a code in order to distinguish and divide the communication channels, which is different from a frequency in a FDMA system and time in TDMA system.

The spreading code generator 1 is used to maintain orthogonality for each rate cycle of data to be diffused (information data) and usually has approximately 4 to 1024 cycles, and a Walsh code and a hierarchical orthogonal code and so on are used.

Receivers on the base station side and on the terminal side which are not illustrated are implementing separation from other communication channel signals by means of auto-correlation or cross-correlation owned by these codes respectively. Also, this code does not change as long as communication with the same base station is maintained, unless a specific code is allocated and a base station or a sector of the destination changes due to a handover or the like.

Scrambling code generators 2, 3 are mainly used to render power flux density on a frequency axis average or more concealable, whereby a code such as M length code, namely one having a cycle of $2^{30}$ or so is usually used. This scrambling code maintains high concealability because of the length of its cycle. In addition, the base stations which are not illustrated have a unique code list, and a terminal can know the number and state of surrounding base stations from it and decoding information.

As shown in FIG. 1, if a spreading code is represented as SP, and a scrambling code for in-phase components and a scrambling code for orthogonal components are represented as Sci and SCq respectively, diffusion code for in-phase components Ci and diffusion code for orthogonal components Cq can be represented as follows respectively.

$$Ci = SP + SCi$$

$$Cq = SP + SCq$$

Here, + represents ExOR and likewise hereafter.

In reality, calculation as follows is conducted with these and in-phase component information data Di and orthogonal component information data Dq, and is transmitted.

$$\text{Transmitting signal} = (Di + jDq) * (Ci + jCq)$$

This transmitting signal can demodulate respective information data by multiplying a complex conjugate of a diffusion code at a receiving division on the base station side or on the terminal side. More specifically, it will is be represented as follows.

$$\text{Transmitting signal} * (Ci - jCq) = (Di + jDq) * (Ci + jCq) * (Ci - jCq)$$

$$= A(Di + jDq)$$

The above spreading code SP (cycle T1) is changed by cycle T2 (T2>T1) owned by a timer 6 at certain intervals. To render a demodulation process and so on easy, T2 should desirably be an integral multiple of T1 or at LAYER 1 synchronization unit intervals. Higher concealability can be provided by performing this process. In this case, TTI (Transmission Time Interval: L1 synchronizing cycle) is inputted in the timer 6 so that switching is implemented based on such a TTI cycle.

Next, operation of diffusion code generator 10 will be described by referring to FIG. 1. The spreading code generator 1 generates orthogonal code list SP of the diffused information data rate cycle (=T1). In addition, scrambling code generators 2, 3 generate M length code Sci, SCq of relatively long cyclicity respectively. Diffusion codes for in-phase components and orthogonal components are computed by ExOR circuits 4, 5 respectively, and diffusion code for in-phase components Ci and diffusion code for orthogonal components Cq are generated.

The timer 6 changes currently set orthogonal code list SP to another different type in a TTI cycle instructed by an upper layer that is not illustrated. In this case, switching by the timer 6 is possible either only in a TTI cycle or in a cycle of T2=N*T1 (N:integer) taking opportunity of TTI or layer 1 synchronous interval unit T3. Moreover, it is possible, by setting the types to be switched by the timer 6 through arrangement with the system Bide in advance, to enhance concealability while considering influence on the system as a whole.

As a specific number or the like is usually given to code list SP to be used, it may be changed by being notified of a new number in communication with a base station or by deciding the number system, cycle and order to be changed in advance.

Figure 2:
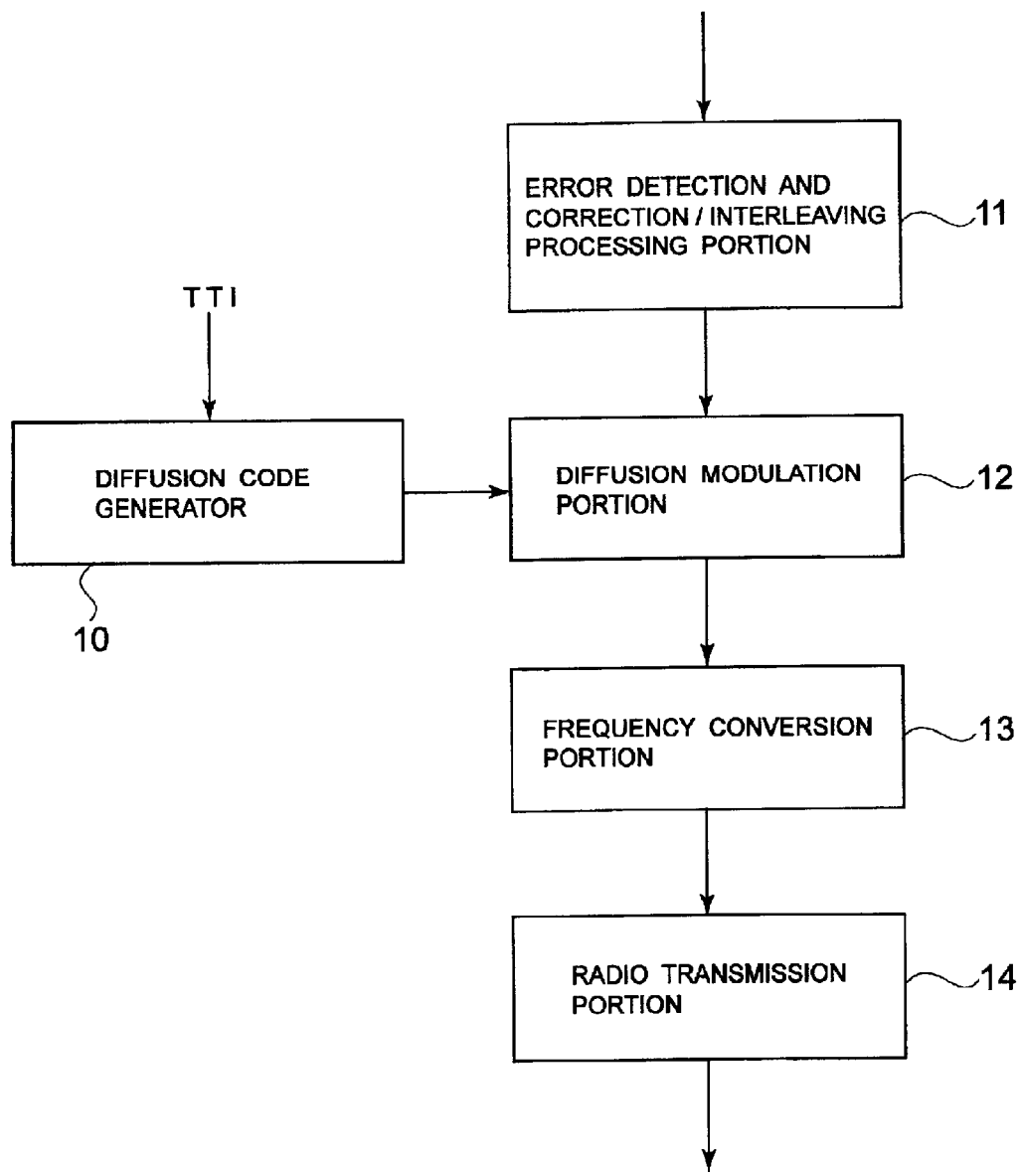
FIG. 2 is a block diagram showing a configuration of a transmission division of a CDMA communication apparatus according to an embodiment of the present invention.

FIG. 2 is a block diagram showing a configuration of a transmission division of a CDMA communication apparatus according to an embodiment of the present invention. In FIG. 2, a transmission division of a CDMA communication apparatus according to an embodiment of the present invention comprises a diffusion code generator 10, an error detection and correction/interleaving processing division 11, a diffusion modulation division 12, a frequency conversion division 13 and a radio transmission division 14.

As mentioned above, a diffusion code generation division 10 generates a different diffusion code list in a TTI cycle instructed by an upper layer and gives it to a diffusion modulation division 12. Error detection and correction/ interleaving processing division 11 performs error detection, correction and interleaving processing to each individual transport block.

The diffusion modulation division 12 performs diffusion modulation of a signal to which error detection and correction/interleaving processing was conducted at error detection and correction/interleaving processing division 11 by using a diffusion code (such as a PN code) given from diffusion code generation division 10, and gives it to the frequency conversion division 13. The frequency conversion division 13 converts a frequency of an output signal from the diffusion modulation division 12 up to a radio frequency band (RF band). An RF signal thus obtained is given from the radio transmission division 14 to a transmitting and receiving antenna via an antenna transmitting and receiving division that is not illustrated, and then is radiated into space.

The diffusion modulation division 12 is given a diffusion code list of a type to be determined at that point in time from the diffusion code generation division 10, and in the diffusion modulation division 12, this diffusion code is used to perform diffusion modulation. As in conventional cases, a signal outputted from the diffusion modulation division 12 undergoes processes such as frequency conversion and transmission power control (power amplification) and then is radiated into space.

Figure 3:
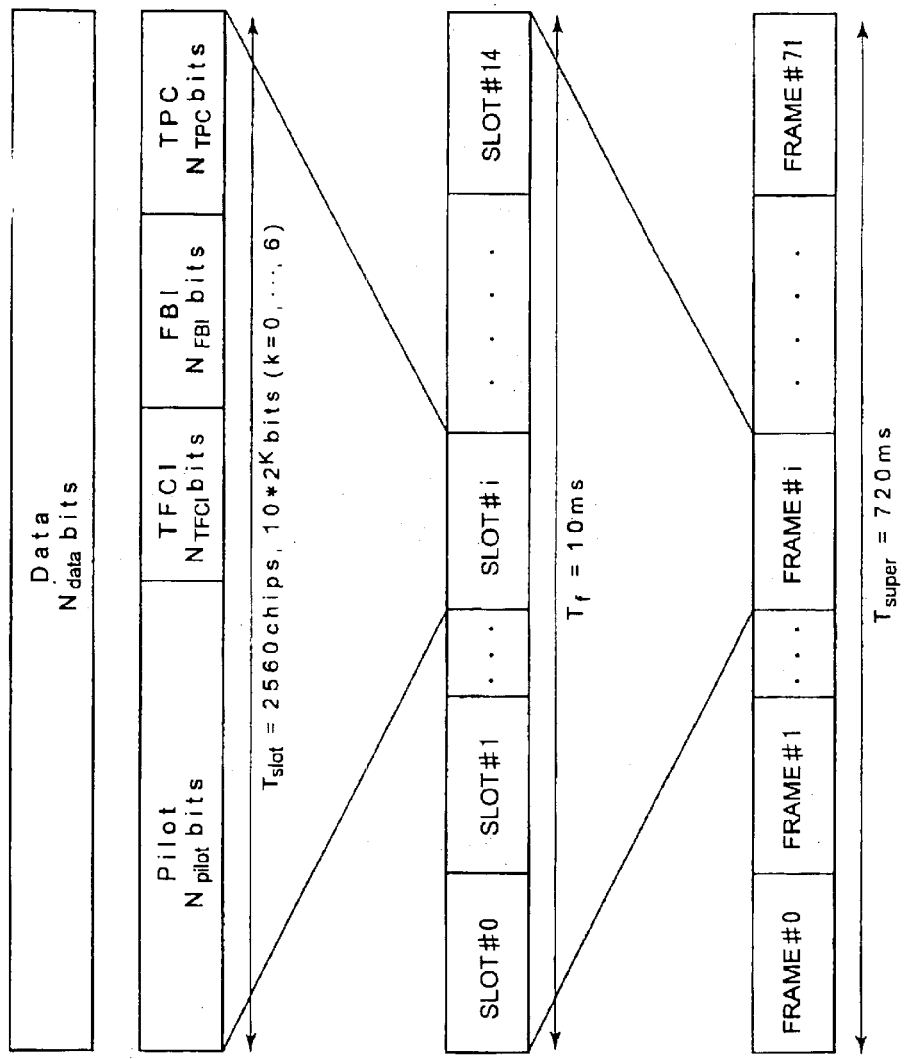
FIG. 3 is a diagram showing a configuration of a transport channel to a physical channel of a 3GPP-specification uplink.

FIG. 3 shows a structure of a transport channel to a physical channel of a 3GPP-specification uplink. In FIG. 3, each data (each data unit is $T_{super}$=720 ms) in the uplink comprises frames #0 to #71 [each frame unit is $T_f$=10 ms), and each frame comprises slots #0 to #14 (each slot unit is $T_{slot}$=2560 chips, $10*2^k$ bits (k=0, . . . , 6)].

Each slot comprises Pilot (Pilot) ($N_{pilot}$ bits), and TFCI (Transport Format Combination Indicator) ($N_{TFCI}$ bits), and FBI (Feed-Back Information) ($N_{FBI}$ bits), and TPC (Transmission Power Control) ($N_{TPC}$ bits), or Data (Data) ($N_{data}$ bits).

Figure 4:
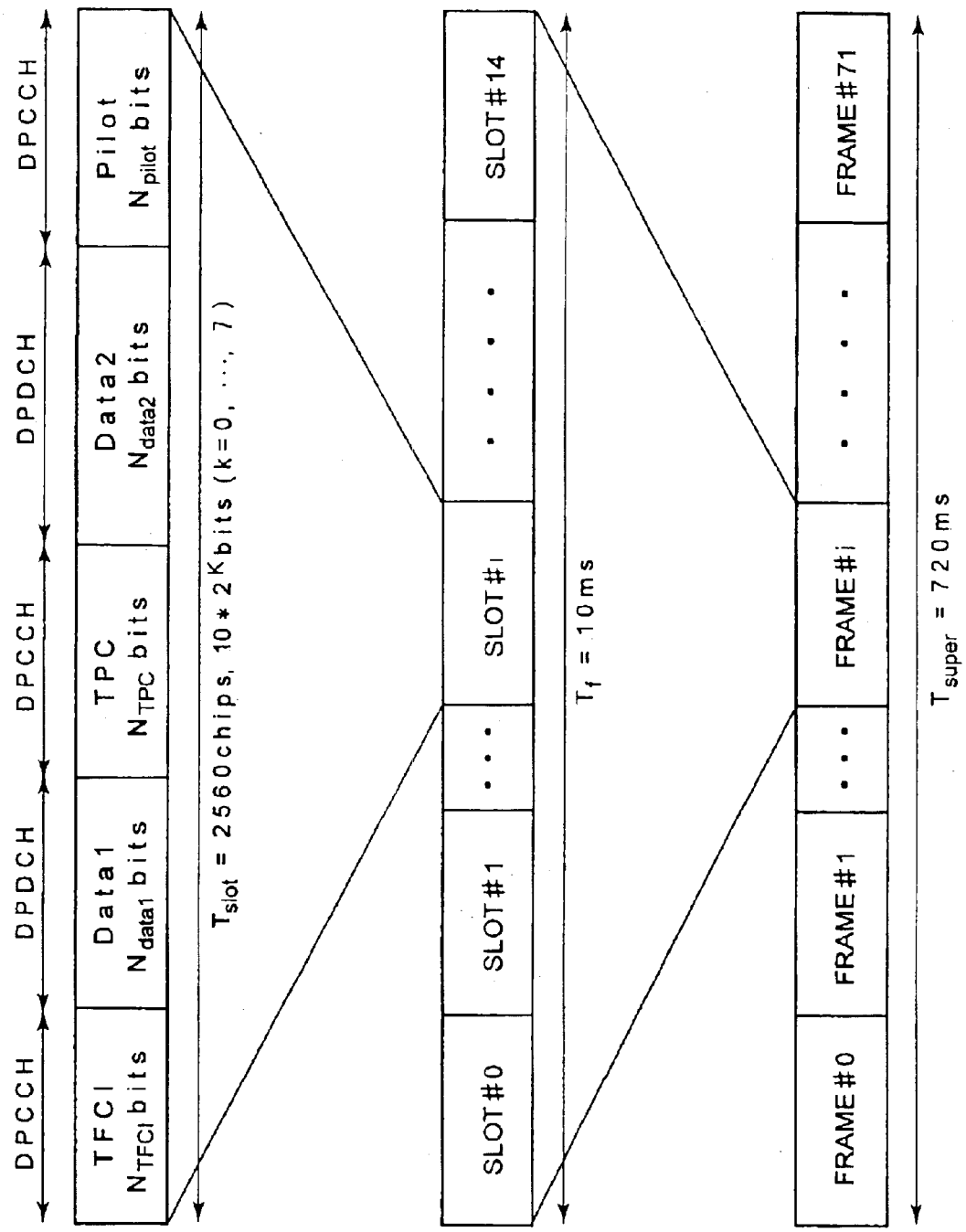
FIG. 4 is a diagram showing a configuration of a transport channel to a physical channel of a 3GPP-specification downlink.

FIG. 4 shows a structure of a transport channel to a physical channel of a 3GPP-specification downlink. In FIG. 4, each data (each data unit is $T_{super}$=720 ms) in the downlink comprises frames #0 to #71 (each frame unit is $T_f$=10 ms), and each frame comprises slots #0 to #14 [each slot unit is $T_{slot}$=2560 chips, $10*2^k$ bits (k=0, . . . , 7)].

Each slot comprises TFCI ($N_{TFCI}$ bits) (DPCCH), and Data1 (Data1) ($N_{data}$ bits) (DPDCH), and TPC ($N_{TPC}$ bits) (DPCCH), and Data2 (Data2) ($N_{data}$ bits) (DPDCH), and Pilot (Pilot) ($N_{pilot}$ bits) (DPCCH).

Figure 5:
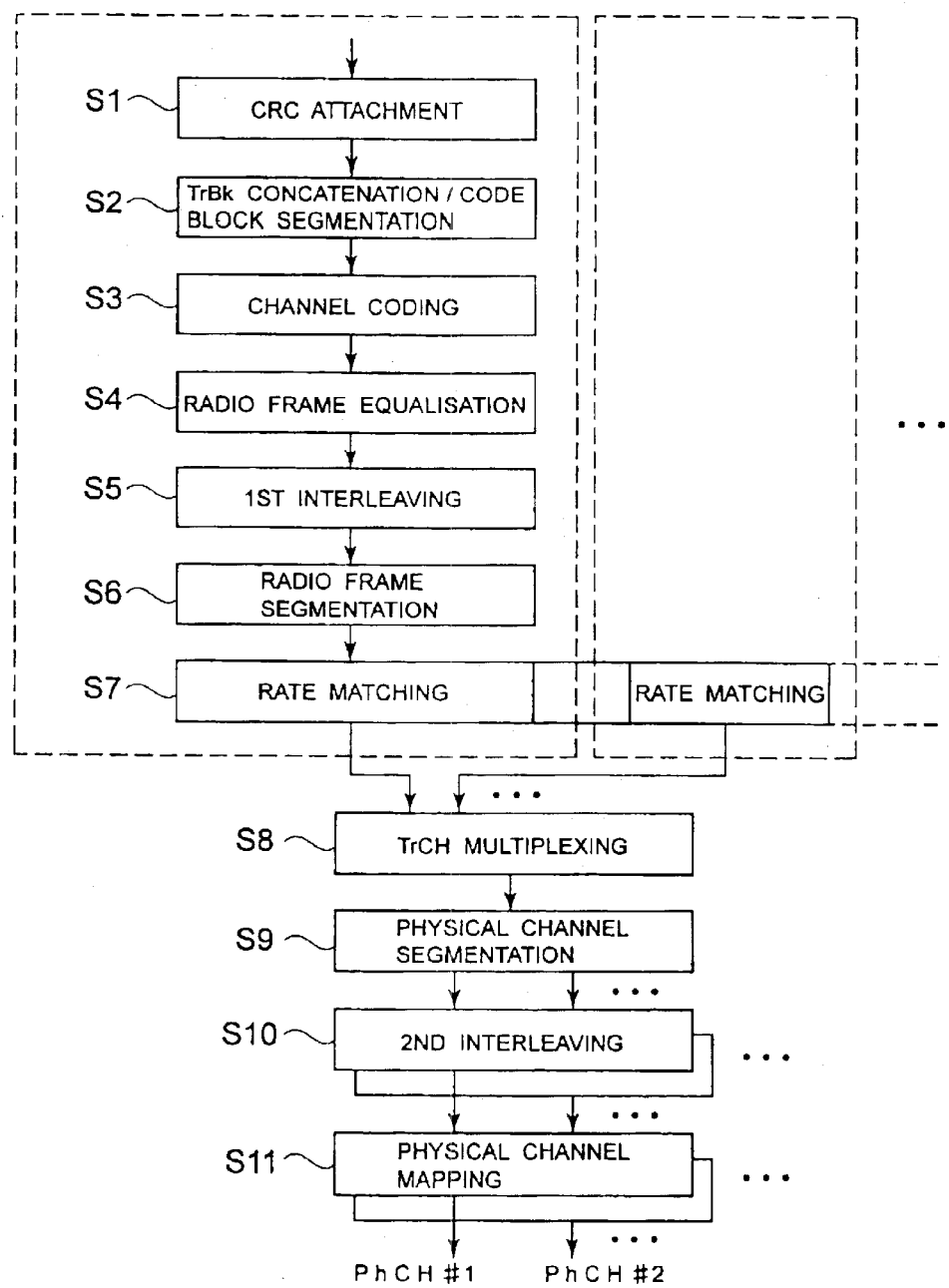
FIG. 5 is a diagram showing a configuration of a 3GPP-specification uplink for DPCH.
Figure 6:
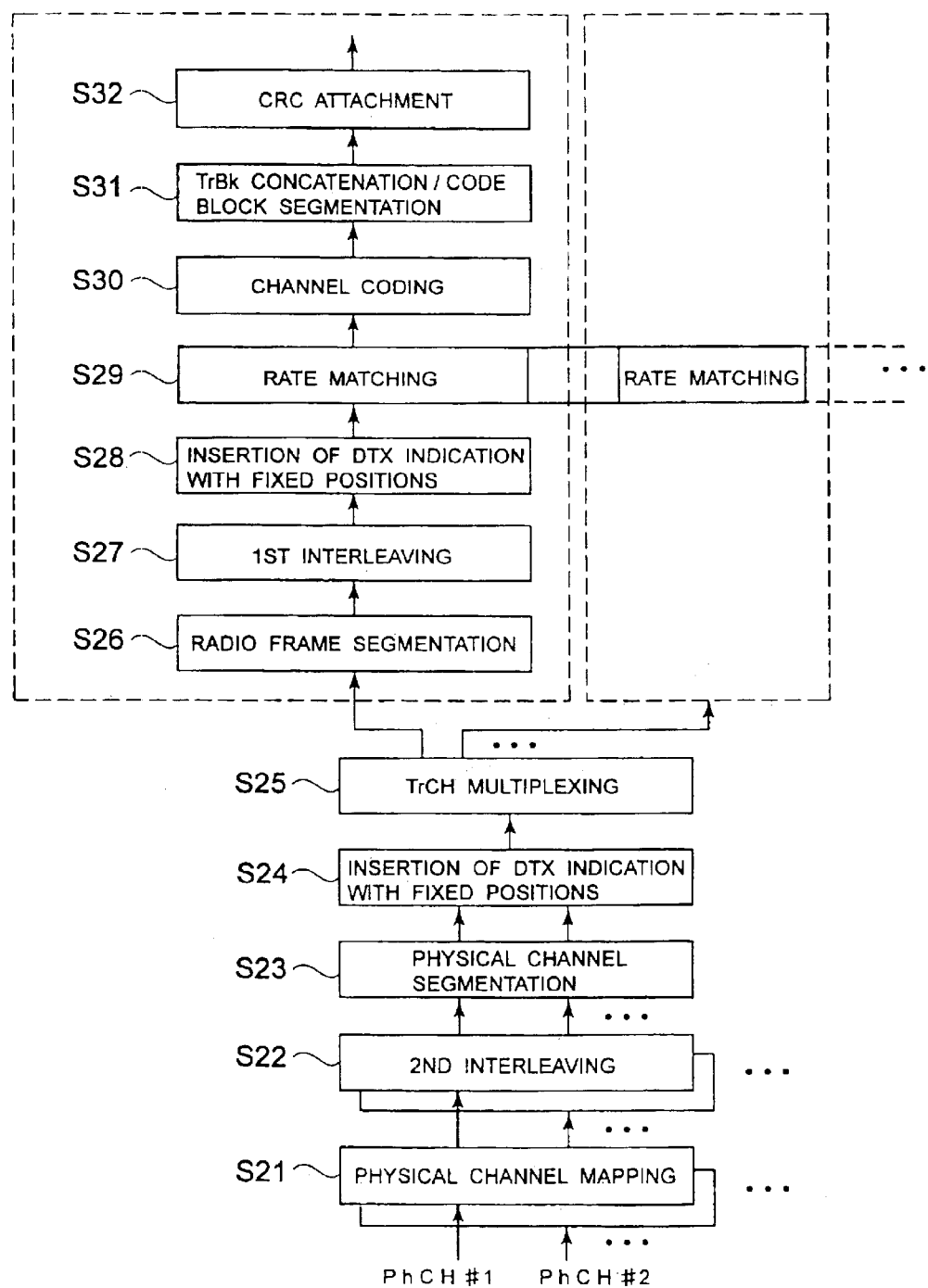
FIG. 6 is a diagram showing a configuration of a 3GPP-specification downlink for DPCH.

FIG. 5 is a flowchart showing a processing flow in a 3GPP-specification uplink for DPCH, and FIG. 6 is a flowchart showing a processing flow in a 3GPP-specification downlink for DPCH.

In an uplink for DPCH, a CRC (Cyclic Redundancy Check code) is added to every transport block in process S1 (CRC attachment).

In process S2 (TrBk concatenation/Code block segmentation), a pieces (1≦a≦N) of transport block with a CRC added are concatenated. Normally, concatenation units are implemented for each individual transport channel. Segmentation is implemented in the case where the concatenated code blocks' number of bits Xi exceeds a certain value z. Ci, the number to be divided is an integral part of a value of a solution to Xi/z plus 1. As the number of bits in any divided unit block is the same, a filler bit (all "0") is inserted into the last unit block for adjustment.

Error correction is performed in process S3 (Channel coding), and interleaving is performed at every TTI (Transmission Time Interval: L1 synchronizing cycle) in process S5 (1st interleaving).

In process S7 (Rate matching), rate matching (repetition or puncturing) is performed considering required quality of each individual transport channel so as not to exceed the total number of bits that can be mapped to physical channels for each individual transport channel.

A transport channel is divided in units of 10 ms that is a radio frame in process S8 (TrCH Multiplexing), and it is implemented in the case of transmitting by a plurality of physical channels in process S9 (Physical channel segmentation).

Interleaving in a radio frame (10 ms) is implemented in process S10 (2nd interleaving), and mapping to a physical channel is performed in process S11 (Physical channel mapping). Incidentally, description of process S4 (Radio frame equalization) and process S6 (Radio frame segmentation) is omitted since they are not directly related to this technology.

Processing in a downlink for DPCH is the processing in the above-mentioned uplink for DPCH performed in reverse, that is in order of S21 to S32, and process S28 (Insertion of DTX indication with fixed positions) is added thereto.

Generally, OK/NG of L1 synchronization is determined by a CRC check. In a WCDMA method, as radio frame segmentation is performed, a CRC bit is added to data bits of N pieces of radio frame integrated by an appropriate rule, which is checked so as to implement it (see FIG. 3).

Time for the above N×frame period (for instance, 10 ms, 20 ms, 40 ms, 80 ms and so on) is called TTI, and hardware processing can be simplified by switching a diffusion code with reference to it. In addition, TTI is different depending on a used application (voice or data communication, etc.), and it is specified by an upper layer. This TTI is inputted to timer 6 so as to make this time the timing for switching.

Figure 7:
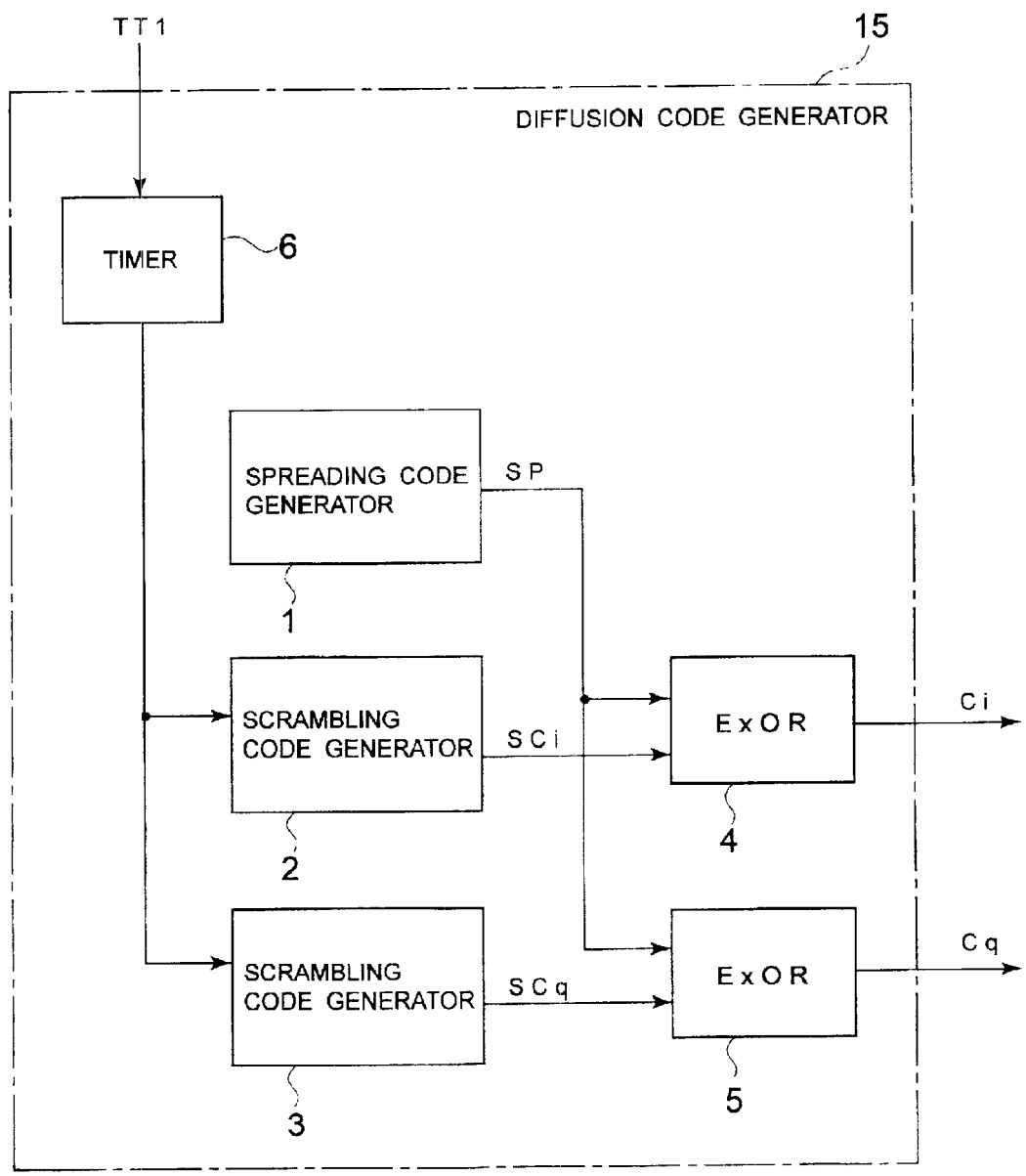
FIG. 7 is a block diagram showing a configuration of a diffusion code generator according to the other embodiment of the present invention.

FIG. 7 is a block diagram showing a configuration of a diffusion code generator according to the other embodiment of the present invention. In FIG. 7, the diffusion code generator 15 has the same configuration as that of the diffusion code generator 10 according to an embodiment of the present invention shown in FIG. 1 except that scrambling code for in-phase components SCi and scrambling code for orthogonal components SCq generated in scrambling code generators 2, 3 by timer 6 are to be changed based on a TTI cycle, where the same components have the same codes. In addition, operation of the same components is the same as that in an embodiment of the present invention.

Thus, higher concealability can also be provided by changing scrambling code for in-phase components SCi and scrambling code for orthogonal components SCq by timer 6 based on a TTI cycle, which does not require redundant hardware and processing.

Figure 8:
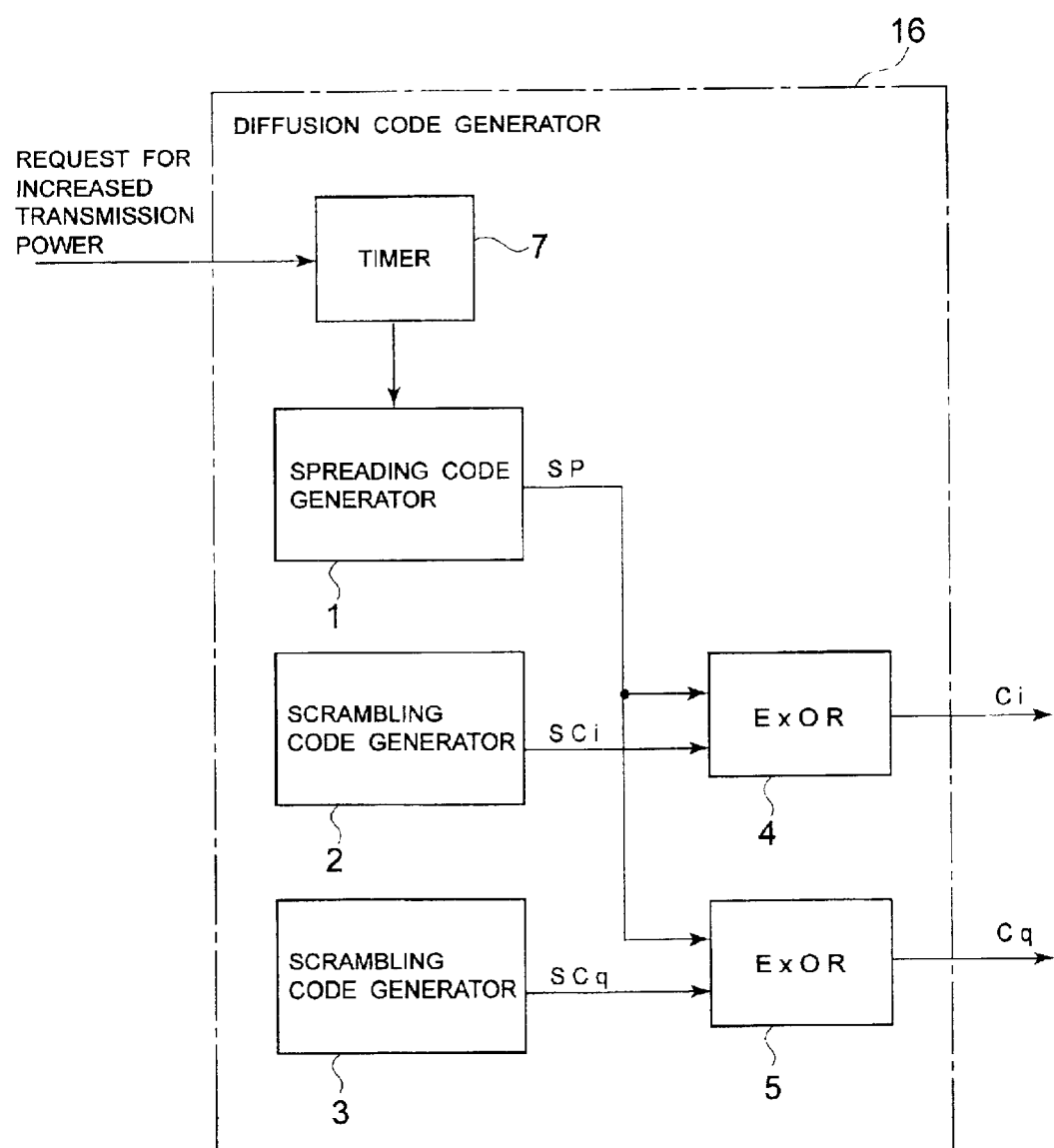
FIG. 8 is a block diagram showing a configuration of a diffusion code generator according to another embodiment of the present invention.

FIG. 8 is a block diagram showing a configuration of a diffusion code generator according to another embodiment of the present invention. In FIG. 8, the diffusion code generator 16 has the same configuration as that of the diffusion code generator 10 according to an embodiment of the present invention shown in FIG. 1 except that timer 7 is provided to change spreading code SP based on a degradation trigger of SIR (Signal/Interval Ratio), where the same components have the same codes. In addition, operation of the same components is the same as that in an embodiment of the present invention.

A CDMA communication apparatus constantly measures and/or estimates SIR during communication to use it for transmission power control and so on. A terminal is constructed so that, if this SIR is degraded, a request for increased transmission power is made to a base station from each individual slot.

Thus, another embodiment of the present invention has the timer 7 input a request for increased transmission power to a base station, and instructs the spreading code generator 1 to change spreading code SP when it occurs N times successively so that higher concealability is provided without requiring redundant hardware and processing.

Figure 9:
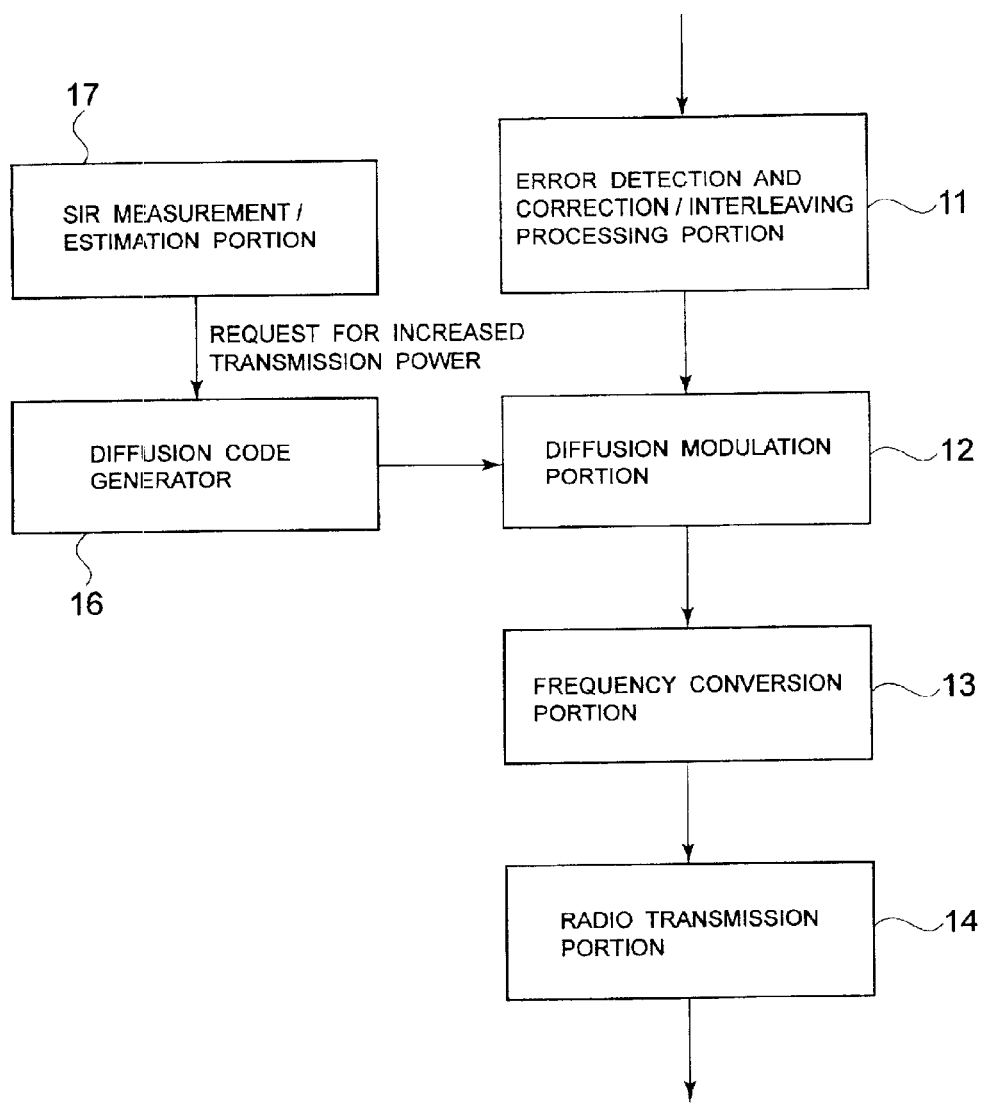
FIG. 9 is a block diagram showing a configuration of a transmission division of a CDMA communication apparatus according to another embodiment of the present invention.

FIG. 9 is a block diagram showing a configuration of a transmission division of a CDMA communication apparatus according to another embodiment of the present invention. In FIG. 9, a transmission division of a CDMA communication apparatus according to another embodiment of the present invention comprises the error detection and correction/interleaving processing division 11, the diffusion modulation division 12, the frequency conversion division 13, the radio transmission division 14, the diffusion code generator 16 and an SIR measurement/estimation division 17. Here, description of the error detection and correction/interleaving processing division 11, diffusion modulation division 12, frequency conversion division 13 and radio transmission division 14 is omitted since they perform operation as mentioned above.

The SIR measurement/estimation division 17 constantly measures and/or estimates SIR during communication, and if this SIR is degraded, it sends a request for increased transmission power to a base station that is not illustrated, where the request for increased transmission power is used for controlling transmission power and so on.

On the other hand, the diffusion code generator 16 has the above-mentioned configuration, and if a request for increased transmission power from the SIR measurement/estimation division 17 is inputted, and when occurring N times successively, it instructs the diffusion code generator 1 to change diffusion code SP so that higher concealability can be provided without requiring redundant hardware and processing.

Moreover, the timer 6 can also perform switching based on a TTI cycle by using a request for increased transmission power from the SIR measurement/estimation division 17 as a trigger. In addition, it is possible, by setting the types to be switched by the timer 6 according to arrangement with the system side in advance, to render concealability higher while considering influence on the system as a whole.

Figure 10:
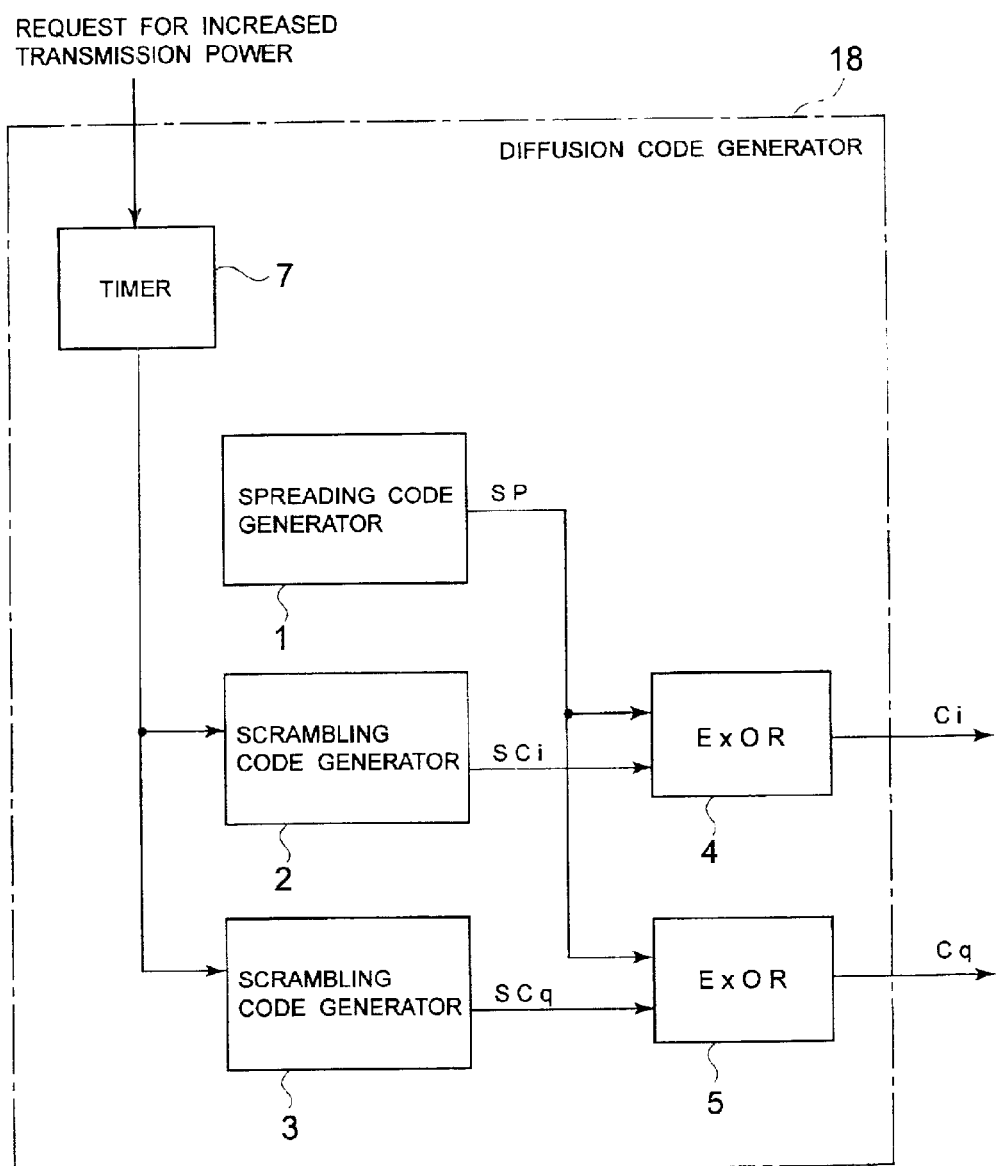
FIG. 10 is a block diagram showing a configuration of a diffusion code generator according to a further embodiment of the present invention.
Figure 11:
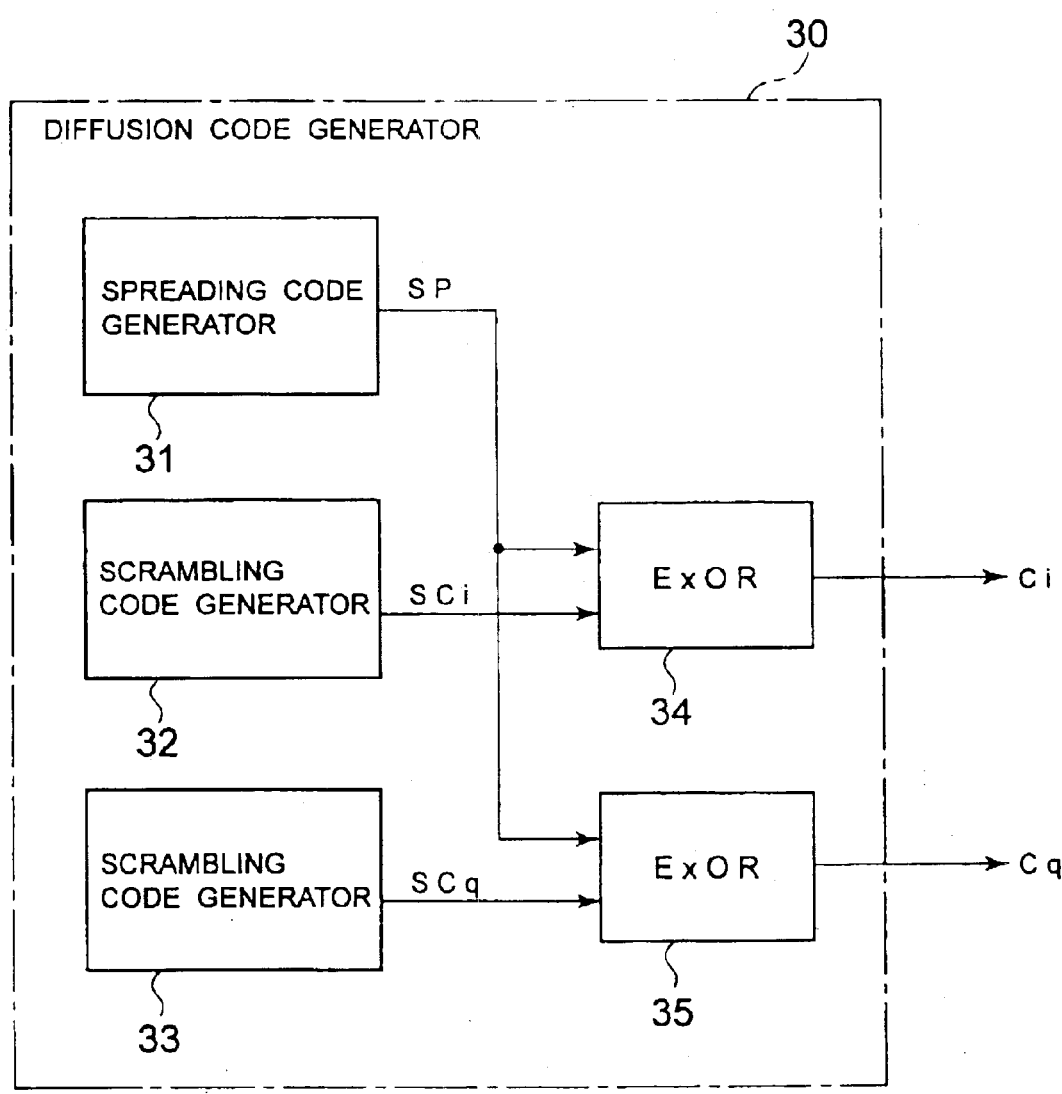
FIG. 11 is a block diagram showing a configuration example of a diffusion code generator according to a conventional example.
Figure 12:
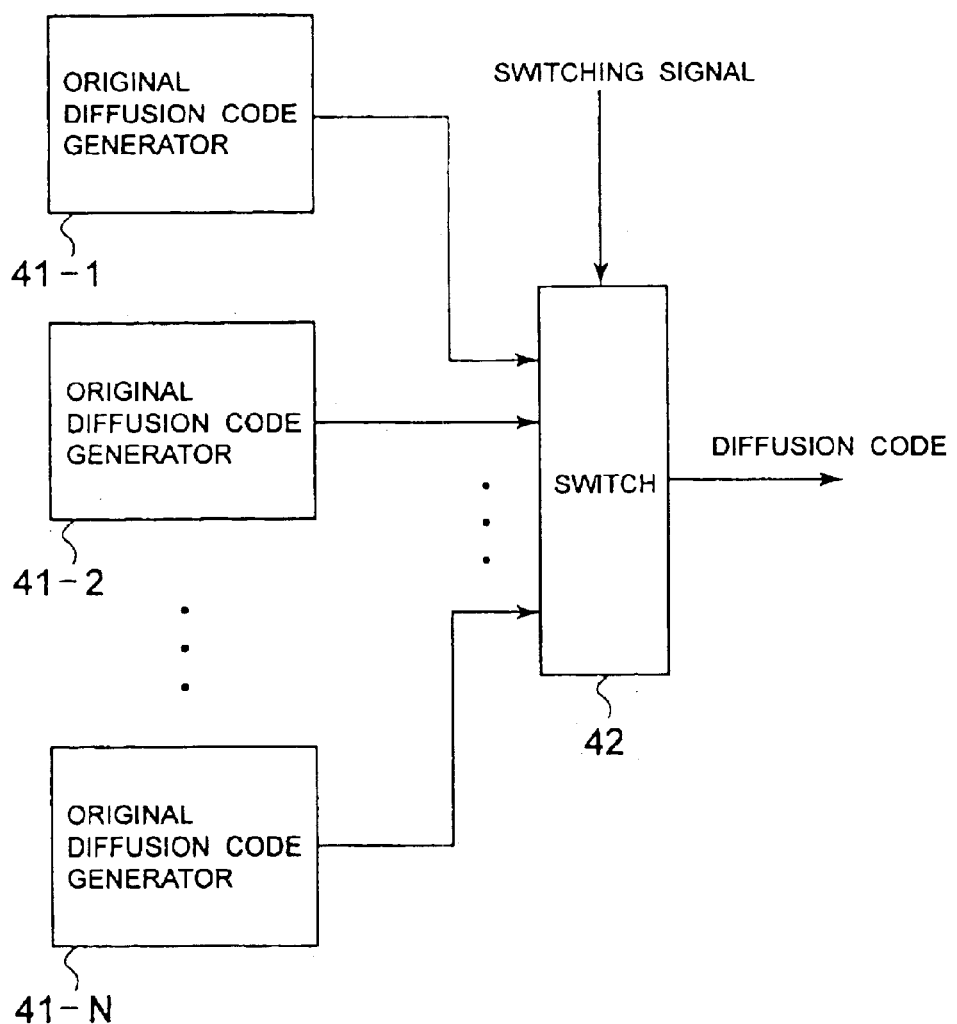
FIG. 12 is a block diagram showing the other configuration example of a diffusion code generator according to a conventional example.

FIG. 10 is a block diagram showing a configuration of a diffusion code generator according to a further embodiment of the present invention. In FIG. 10, a diffusion code generator 18 has the same configuration as that of the diffusion code generator 16 according to another embodiment of the present invention shown in FIG. 8 except that scrambling code for in-phase components SCi and scrambling code for orthogonal components SCq generated in the scrambling code generators 2, 3 by the timer 7 are to be changed based on a degradation trigger of SIR, where the same components have the same codes. In addition, operation of the same components is the same as that in another embodiment of the present invention.

Thus, higher concealability can also be provided by changing scrambling code for in-phase components SCi and scrambling code for orthogonal components SCq by the timer 7 based on a degradation trigger of SIR, which does not influence communication quality and transmission data.

As described above, the method of generating a diffusion code of the present invention changes, during communication, the type of code list generated in either means for generating a spreading code that generates a code list of high orthogonality or means for generating a scrambling code that generates a code list of a long cycle based on an L1 synchronizing cycle determined by a CRC check, having the effect of consequently rendering interception and eavesdropping of communication difficult, without influencing communication quality and transmission data.

Also, the method of generating a diffusion code of the present invention changes, during communication, the type of code list generated in either means for generating a spreading code that generates a code list of high orthogonality or means for generating a scrambling code that generates a code list of a long cycle based on a degradation trigger of a signal/noise ratio used for controlling transmission power at least, having the effect of consequently rendering interception and eavesdropping of communication difficult, without influencing communication quality and transmission data.

What is claimed is:

1. A diffusion code generator, comprising:
   means for generating a spreading code that generates a code list of high orthogonality;
   means for generating a scrambling code that generates a code list of a long cycle;
   computing means for performing a logical operation of the code lists generated in said means for generating a spreading code and said means for generating a scrambling code respectively; and
   timer means for changing during communication the type of code list generated in said means for generating a spreading code based on one of a TTI cycle and LAYER 1 synchronizing unit intervals,
   wherein the TTI cycle is a number of frames multiplied by a frame period, and a LAYER 1 synchronizing unit interval is a time between a synchronization slip off time and a next synchronization slip off time.

2. A diffusion code generator, comprising:
   means for generating a spreading code that generates a code list of high orthogonality;
   means for generating a scrambling code that generates a code list of a long cycle;
   computing means for performing a logical operation of the code lists generated in said means for generating a spreading code and said means for generating a scrambling code respectively; and
   timer means for changing during communication the type of code list generated in said means for generating a spreading code, based on one of a TTI cycle and LAYER 1 synchronizing unit intervals,
   wherein the TTI cycle is a number of frames multiplied by a frame period, and a LAYER 1 synchronizing unit interval is a time between a synchronization slip off time and a next synchronization slip off time.

3. The diffusion code generator according to claim 1, wherein said computing means is constructed so as to perform an exclusive-OR operation of the code lists generated in said means for generating a spreading code and said means for generating a scrambling code respectively.

4. The diffusion code generator according to claim , wherein said timer means is constructed so as to change the type of said code list in response to a degradation trigger of a signal/noise ratio used for controlling transmission power at least.

5. A diffusion code generator, comprising:
   means for generating a spreading code that generates a code list of high orthogonality;
   means for generating a scrambling code that generates a code list of a long cycle; and
   computing means for performing a logical operation of the code lists generated in said means for generating a spreading code and said means for generating a scrambling code respectively, and
   wherein there is provided timer means for changing the type of code list generated in either said means for generating a spreading code or said means for generating a scrambling code, based on a degradation trigger of a signal/noise ratio used for controlling transmission power and based on at least one of a TTI cycle and LAYER 1 synchronizing unit intervals,
   wherein the TTI cycle is a number of frames multiplied by a frame period, and a LAYER 1 synchronizing unit interval is a time between a synchronization slip off time and a next synchronization slip off time.

6. The diffusion code generator according to claim 5, wherein said computing means is constructed so as to perform an exclusive-OR operation of the code lists generated in said means for generating a spreading code and said means for generating a scrambling code respectively.

7. A CDMA communication apparatus for performing communication between a base station and a plurality of terminals by using a diffusion code generated by a diffusion code generator, wherein said diffusion code generator comprises:
   means for generating a spreading code that generates a code list of high orthogonality;
   means for generating a scrambling code that generates a code list of a long cycle;
   computing means for performing a logical operation of the code lists generated in said means for generating a spreading code and said means for generating a scrambling code respectively; and
   timer means for changing during communication the type of code list generated in said means for generating a spreading code, based on one of a TTI cycle and LAYER 1 synchronizing unit intervals,
   wherein the TTI cycle is a number of frames multiplied by a frame period, and a LAYER 1 synchronizing unit interval is a time between a synchronization slip off time and a next synchronization slip off time.

8. A CDMA communication apparatus for performing communication between a base station and a plurality of terminals by using a diffusion code generated by a diffusion code generator, wherein said diffusion code generator comprises:
   means for generating a spreading code that generates a code list of high orthogonality;
   means for generating a scrambling code that generates a code list of a long cycle;
   computing means for performing a logical operation of the code lists generated in said means for generating a spreading code and said means for generating a scrambling code respectively; and
   timer means for changing during communication the type of code list generated in said means for generating a spreading code, based on one of a TTI cycle and LAYER 1 synchronizing unit intervals,
   wherein the TTI cycle is a number of frames multiplied by a frame period, and a LAYER 1 synchronizing unit interval is a time between a synchronization slip off time and a next synchronization slip off time.

9. The CDMA communication apparatus according to claim 7, wherein said computing means is constructed so as to perform an exclusive-OR operation of the code lists generated in said means for generating a spreading code and said means for generating a scrambling code respectively.

10. The CDMA communication apparatus according to claim 7, wherein, for the same base station to distinguish between said plurality of terminals and communication channels, a spreading code unique to each individual communication channel is used and a common scrambling code is used.

11. The CDMA communication apparatus according to claim 7, wherein, for the same base station to distinguish between said plurality of terminals and communication channels, a spreading code unique to each individual terminal is used and a common scrambling code is used.

12. The CDMA communication apparatus according to claim 7, wherein said timer means is constructed so as to change the type of said code list in response to a degradation trigger of a signal/noise ratio used for controlling transmission power at least.

13. A CDMA communication apparatus for performing communication between a base station and a plurality of terminals by using a diffusion code generated by a diffusion code generator, wherein said diffusion code generator comprises:

means for generating a spreading code that generates a code list of high orthogonality;

means for generating a scrambling code that generates a code list of a long cycle;

computing means for performing a logical operation of the code lists generated in said means for generating a spreading code and said means for generating a scrambling code respectively; and timer means for changing during communication the type of code list generated in said means for generating a spreading code, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

14. The CDMA communication apparatus according to claim 13, wherein said computing means is constructed so as to perform an exclusive-OR operation of the code lists generated in said means for generating a spreading code and said means for generating a scrambling code respectively.

15. The CDMA communication apparatus according to claim 13, wherein, for the same base station to distinguish between said plurality of terminals and communication channels, a spreading code unique to each individual communication channel is used and a common scrambling code is used.

16. The CDMA communication apparatus according to claim 13, wherein, for the same base station to distinguish between said plurality of terminals and communication channels, a spreading code unique to each individual terminal is used and a common scrambling code is used.

17. A method of generating a diffusion code of a diffusion code generator comprising:

means for generating a spreading code that generates a code list of high orthogonality;

means for generating a scrambling code that generates a code list of a long cycle; and computing means for performing a logical operation of the code lists generated in said means for generating a spreading code and said means for generating a scrambling code respectively, wherein the type of code list generated in said means for generating a spreading code is changed during communication, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

18. A method of generating a diffusion code of a diffusion code generator, comprising:

means for generating a spreading code that generates a code list of high orthogonality;

means for generating a scrambling code that generates a code list of a long cycle; and computing means for performing a logical operation of the code lists generated in said means for generating a spreading code and said means for generating a scrambling code respectively, wherein the type of code list generated in said means for generating a spreading code is changed during communication, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

19. The method of generating a diffusion code according to claim 17, wherein said computing means is constructed so as to perform an exclusive-OR operation of the code lists generated in said means for generating a spreading code and said means for generating a scrambling code respectively.

20. The method of generating a diffusion code according to claim 17, wherein the type of said code list is changed in response to a degradation trigger of a signal/noise ratio used for controlling transmission power at least.

21. A method of generating a diffusion code of a diffusion code generator, comprising:

means for generating a spreading code that generates a code list of high orthogonality;

means for generating a scrambling code that generates a code list of a long cycle; and computing means for performing a logical operation of the code lists generated in said means for generating a spreading code and said means for generating a scrambling code respectively, wherein the type of code list generated in said means for generating a spreading code is changed, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

22. The method of generating a diffusion code according to claim 21, wherein said computing means is constructed so as to perform an exclusive-OR operation of the code lists generated in said means for generating a spreading code and said means for generating a scrambling code respectively.

23. A method of generating a diffusion code of a CDMA communication apparatus for performing communication between a base station and a plurality of terminals by using a diffusion code generated by a diffusion code generator, wherein said diffusion code generator changes during communication the type of code list generated in either said means for generating a spreading code that generates a code list of high orthogonality or said means for generating a scrambling code that generates a code list of a long cycle based on at least one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

24. A method of generating a diffusion code of a CDMA communication apparatus for performing communication between a base station and a plurality of terminals by using a diffusion code generated by a diffusion code generator, wherein said diffusion code generator changes during communication the type of code list generated in said means for generating a spreading code that generates a code list of high orthogonality, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

25. The method of generating a diffusion code according to claim 24, wherein an exclusive-OR operation of the code lists generated in said means for generating a spreading code and said means for generating a scrambling code respectively is performed so as to output said diffusion code.

26. The method of generating a diffusion code according to claim 24, wherein, for the same base station to distinguish between said plurality of terminals and communication channels, a spreading code unique to each individual communication channel is used and a common scrambling code is used.

27. The method of generating a diffusion code according to claim 24, wherein, for the same base station to distinguish between said plurality of terminals and communication channels, a spreading code unique to each individual terminal is used and a common scrambling code is used.

28. The method of generating a diffusion code according to claim 24, wherein the type of said code list is changed in response to a degradation trigger of a signal/noise ratio used for controlling transmission power at least.

29. A method of generating a diffusion code of a CDMA communication apparatus for performing communication between a base station and a plurality of terminals by using a diffusion code generated by a diffusion code generator, wherein said diffusion code generator changes during communication the type of code list generated in said means for generating a spreading code, based on one of a TTI cycle and LAYER 1 synchronizing unit intervals, wherein the TTI cycle is a number of frames multiplied by a frame period, and a LAYER 1 synchronizing unit interval is a time between a synchronization slip off time and a next synchronization slip off time.

30. The method of generating a diffusion code according to claim 29, wherein an exclusive-OR operation of the code lists generated in said means for generating a spreading code and said means for generating a scrambling code respectively is performed so as to output said diffusion code.

31. The method of generating a diffusion code according to claim 29, wherein, for the same base station to distinguish between said plurality of terminals and communication channels, a spreading code unique to each individual communication channel is used and a common scrambling code is used.

32. The method of generating a diffusion code according to claim 29, wherein, for the same base station to distinguish between said plurality of terminals and communication channels, a spreading code unique to each individual terminal is used and a common scrambling code is used.

* * * * *